May 10, 1949. R. W. CUTHILL 2,469,372
NONSLIPPING RUBBER BASE MATERIALS
Filed Jan. 29, 1946

INVENTOR.
ROBERT W. CUTHILL.
BY
ATTORNEY.

Patented May 10, 1949

2,469,372

UNITED STATES PATENT OFFICE 2,469,372

NONSLIPPING RUBBER BASE MATERIALS

Robert W. Cuthill, Springfield Township,
Delaware County, Pa.

Application January 29, 1946, Serial No. 644,014

3 Claims. (Cl. 260—750)

(Granted under the act of March 3, 1883, as
amended April 30, 1928; 370 O. G. 757)

This invention relates to new and useful improvements in the composition and design of non-slipping rubber base materials, in sheet, slab or molded form, and more particularly to non-slip shoe soles, non-slip rubber belting, ladder pads, stair treads, bath mats, pneumatic tire treads, stepping surfaces on aircraft and the like. It is specially suitable for carrier flight deck shoe soles, and samples for this purpose are now being tested at the National Bureau of Standards as requested by the National Inventors' Council of the Department of Commerce.

One of the most insecure places to walk on is the flight deck of an aircraft carrier. It is a wide open space exposed to high winds and waves and with nothing to hold on to. It may be slippery with water, oil, ice and blood and it may be pitching at steep angles. For the safety of flight personnel better non-slipping shoe soles are desired. Primarily this invention relates to such non-slipping shoe soles but it is evident that it is equally useful for the other purposes and applications as claimed. The various geometrical designs of commercial rubber soles help to prevent slipping while the soles are new but these tend to lose their grip as the design wears off. Further, commercial rubber soles have no non-slip ingredients in the rubber composition. In fact, all commercial rubber non-slip materials depend only on surface design or shallow hemispherical vacuum cups. Further, it is often necessary to cover pulleys with leather or cork inserts to make rubber belts grip.

With the foregoing in mind, the principal object of this invention is to provide a rubber base composition non-slipping shoe-sole designed for superior gripping qualities on the most slippery surfaces such as icy sidewalks, carrier flight decks, slaughter house floors and the like.

Another object of this invention is to provide a rubber composition automotive vehicle tire tread of a skid resisting composition and design. Another object of this invention is to provide a rubber surfaced power belt of a non-slipping composition and design.

A further object of this invention is to provide miscellaneous rubber base materials such as ladder pads, bath mats, stair-treads, stepping surfaces on aircraft and the like of a non-slipping composition and design.

A still further object of this invention is to provide rubber base materials of any or all of the aforesaid types of a design and composition the non-slipping qualities of which will be unaffected by surface wear.

A still further object of this invention is to use non-slipping ingredients in the rubber base which are plentiful and inexpensive and which are chemically neutral to the other ingredients in either natural or synthetic rubber.

And a still further object of this invention is to provide in this invention the strongest possible vacuum cups by means of a triple seal which holds tight under pressure but which instantly releases on removal of load.

Still a further object of this invention is to combine integrally rubber, wood and cork, heretofore used separately in shoe soles so as to embrace all their inherently advantageous qualities.

These and other objects of this invention and the various details of the composition and design thereof are more fully set forth hereinafter and described with reference to the accompanying drawing in which a non-slipping shoe sole and heel are used as a typical exemplification of this invention, and in which Fig. 1 is the plan view of the under side of a sole and heel assembly of a shoe incorporating the composition and design features of this invention, showing the vacuum cups, rings and vents, and the distribution of the wood and cork particles.

Figure 2:
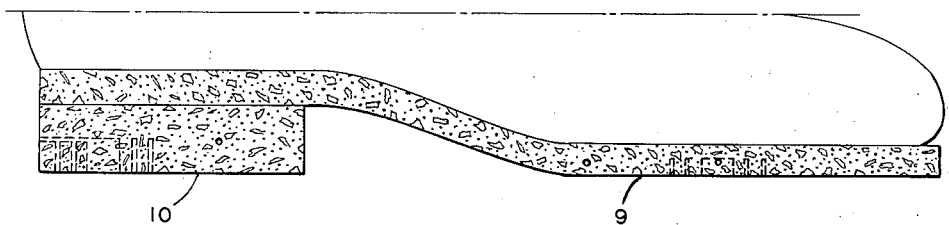
Fig. 2 is an elevational view of the above described assembly showing the shape and depth of the vacuum cups and rings and the location of the venting ducts.
Figure 1:
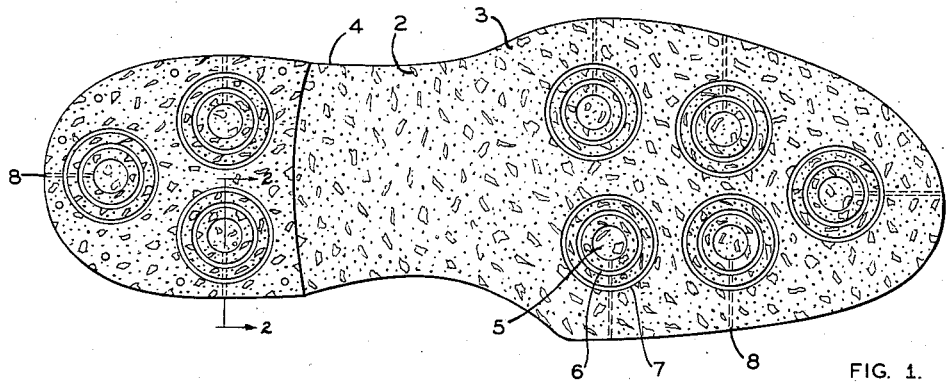
Figure 3:
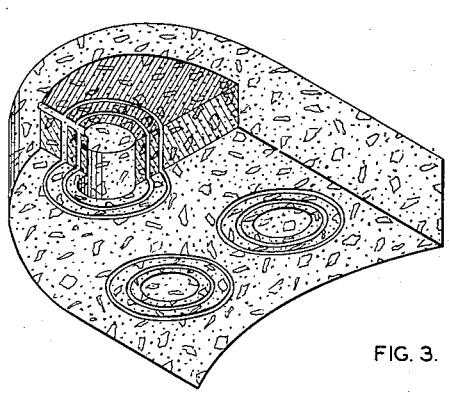
Fig. 3 is a perspective view of the heel partly cut away so as to depict the vent duct interconnecting with a typical vacuum cup and rings.
Figure 4:
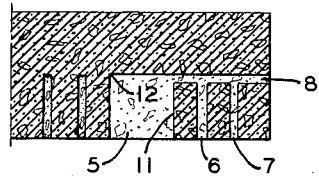
Fig. 4 is a section view taken substantially on line 2—2 of Fig. 1 showing a cross section of a vacuum cup, rings and vent duct.

Referring now more particularly to the drawing, the various views show a shoe sole 9 and heel 10 of either natural or synthetic rubber in which is distributively incorporated gritty particles of hard wood saw-dust 2 and granulated cork 3 thoroughly admixtured and thermoplastically bonded into the rubber matrix 4. The contiguous exposed particles of wood 2 and cork 3 constitute a safety tread surface, inherently continuous by the exposure of new particles as the surface wears away. Only large particles of wood and cork are used from $\frac{1}{16}''$ to $\frac{1}{8}''$ in size. These ingredients maintain their non-slip properties independent of the quantity or quality of the various other constituents of the rubber compound which are processed into a homogeneous mass. This hybrid material combines the hard wearing qualities of the wooden sabot, the softness of the cork sole and the toughness of the rubber galosh, proportionate to the Durometer or Shore hardness specified. The hollow space design also saves materials, reduces weight, adds cushioning, and induces quick cooling after molding and so prevents progressive vulcanization after manufacture. This material is non-sparking and dielectric.

The rubber matrix 4 shall not be less than forty per cent by volume of natural or synthetic rubber to suit the water, oil or other liquid conditions where the shoes are worn; twenty per cent by volume of gritty hardwood saw-dust 2, about $\frac{1}{16}$" to $\frac{1}{8}$" size; five per cent granulated cork 3, $\frac{1}{16}$" to $\frac{1}{8}$" size; and about thirty-five per cent of the fillers, pigments, activators, accelerators, sulphur and carbon customarily used in the art. The usual manufacturing process would first be a thorough mixing operation in a mixing mill with all the compounding ingredients. This mixture is then passed between calendering rolls to form sheets or slabs or into molds to form shapes; after which it is vulcanized by any of the usual methods.

In addition to the safety tread surface produced by the specified ingredients, the non-skid qualities of this sole are further enhanced by novel and effective vacuum cups 5, each concentrically supersealed by two vacuum rings 6 and 7. The vacuum cup and rings have straight walls 11, so that there is no loss in area as the sole and heel wear away. Further, there is a small radius 12 at the bottom of each vacuum cup and ring to prevent any rupture at the right angle juncture of the adjacent surfaces. The pedestrian's weight on the vacuum cups 5 ensure a secure grip on the deck or other surface and this grip is further improved by the supplementary vacuum rings 6 and 7. Intercommunicating with the vacuum cup 5 and the vacuum rings 6 and 7 is a ventilating duct 8 venting outwardly to the side of the shoe sole 9 or heel 10. Under the pedestrian's weight the vent duct 8 remains closed thus maintaining the vacuum grip. As the weight lightens the duct 8 gradually opens thus breaking the vacuum. Each wall 11 of each vacuum cup 5 and rings 6 and 7 is at right angles to the wearing surface so there is no change in non-slip effectiveness during the life of the sole and heel.

The foregoing composition and design features of this sole and heel and the efficient practical uses thereof are equally applicable to the other purposes named, such as for rubber belting, tire treads, ladder pads, stair treads, stepping surfaces on planes and similar uses, and need not be specifically reiterated.

From the foregoing, it will be observed that the present invention, by the combination of its composition and design features, provides a novel and highly desirable improvement in the art of non-slip materials and will greatly add to the protection of life and limb and to efficiency in other applications. Further, there are no ingredients difficult to obtain or manufacturing operations not within the capacity of existing trade machinery.

While particlar embodiments of the invention have been illustrated and described herein, it is not intended to limit the invention to such disclosure, and changes and modifications may be made and incorporated within the scope of the claims.

The invention described herein may be manufactured and used by or for the Government of the United States of America for governmental purposes without the payment of any royalties thereon or therefor.

I claim:

1. A non-slip safety tread comprising by volume not less than 40% rubber matrix, 35% pigment, and 25% large granular particles of cork and hardwood intermixed therethrough with the hardwood considerably exceeding the cork in percentage.

2. A non-slip safety tread comprising by volume not less than 40% rubber matrix, 35% pigment, 5% granulated cork, and 20% hardwood sawdust, said granuated cork and sawdust being approximately $\frac{1}{16}$ inch to $\frac{1}{8}$ inch in size.

3. A non-slip material comprising a pliant rubber base constituting approximately 40% by volume of the material, and an admixture of cork granules and coarse hardwood sawdust distributed therethrough in a ratio of approximately 4 parts of hardwood to each part of cork.

ROBERT W. CUTHILL.

REFERENCES CITED

The following references are of record in the file of this patent:

UNITED STATES PATENTS

| Number | Name | Date |
|---|---|---|
| 921,452 | Pierce | May 11, 1909 |
| 1,591,018 | Cutler | July 6, 1926 |
| 2,250,987 | Dunbar | July 29, 1941 |
| 2,305,741 | Siers | Dec. 22, 1942 |
| 2,313,508 | Carman | Mar. 9, 1943 |
| 2,434,207 | Gapen | Jan. 6, 1948 |

FOREIGN PATENTS

| Number | Country | Date |
|---|---|---|
| 376,318 | Great Britain | July 11, 1932 |
| 608,566 | Germany | Jan. 26, 1935 |

OTHER REFERENCES

9 Pgs., "LaCaoutchone & LaGuttapercha of 1927, pps. 13528-9.